United States Patent
Danielson et al.

(10) Patent No.: US 9,984,802 B2
(45) Date of Patent: May 29, 2018

(54) ELECTRONIC DEVICE HAVING A MAGNETIC ON-OFF SWITCH

(71) Applicant: Logitech Europe S.A., Lausanne (CH)

(72) Inventors: Alexander S. Danielson, Vancouver, WA (US); Thomas Henry Carlson, Jr., Vancouver, WA (US); William Christopher Carmichael, Vancouver, WA (US)

(73) Assignee: LOGITECH EUROPE, S.A., Lausanne (CH)

( * ) Notice: Subject to any disclaimer, the term of this patent is extended or adjusted under 35 U.S.C. 154(b) by 60 days.

(21) Appl. No.: 15/285,339

(22) Filed: Oct. 4, 2016

(65) Prior Publication Data

US 2018/0096770 A1 Apr. 5, 2018

(51) Int. Cl.
| | |
|---|---|
| *H04R 1/10* | (2006.01) |
| *H01F 7/02* | (2006.01) |
| *H04R 9/02* | (2006.01) |
| *H04R 29/00* | (2006.01) |
| *G01D 5/14* | (2006.01) |
| *G01B 7/14* | (2006.01) |

(52) U.S. Cl.
CPC ............ *H01F 7/0294* (2013.01); *G01B 7/14* (2013.01); *G01D 5/142* (2013.01); *G01D 5/145* (2013.01); *H01F 7/0263* (2013.01); *H04R 1/10* (2013.01); *H04R 1/105* (2013.01); *H04R 9/025* (2013.01); *H04R 29/003* (2013.01); *A44D 2203/00* (2013.01)

(58) Field of Classification Search
CPC ..... H01F 7/0263; H01F 7/0294; G01D 5/142; G01D 5/145; G01B 7/14; A44D 2203/00; H04R 1/10–1/1091
See application file for complete search history.

(56) References Cited

U.S. PATENT DOCUMENTS

| | | |
|---|---|---|
| 2008/0317242 A1 | 12/2008 | Bohush et al. |
| 2008/0317274 A1 | 12/2008 | Kim |
| 2015/0195639 A1 | 7/2015 | Azmi et al. |
| 2016/0057530 A1 | 2/2016 | Anderson et al. |

OTHER PUBLICATIONS

Differentiate Your Product Design with Polymagnets. Polymagnet. com. 2015.
Smart Magnets for Smart Product Design. Polymagnet.com. 2015.
(Continued)

*Primary Examiner* — Ramon M Barrera
(74) *Attorney, Agent, or Firm* — Patterson & Sheridan, LLP (57) ABSTRACT

Embodiments of the present disclosure relate to a headphone or speaker assembly that contains two or more audio components that are configured to be magnetically coupled together by use of a complementary magnetic pole configuration in the headphone or speaker assembly to provide one or more useful functions. These useful functions may include elements that are able to sense that the two or more audio components are in contact with each other, or are at least proximate to each other, so that their audio playback capability can be suspended while they are in this unused state. A sensor located within one of the components can detect a change in the magnetic field and generate an electronic signal indicating a clasped condition.

19 Claims, 9 Drawing Sheets

(56) References Cited

OTHER PUBLICATIONS

Smart Magnets for Product Design that Surprises the Senses. Polymagnet Correlated Magnetics. Jan. 5, 2016.
Differentiate Your Product Design with Polymagnets. 2015 Correlated Magnetics Research.
Smart Magnets for Precision Alignment. 2015 Correlated Magnetics Research.
What's Special About Polymagnets. http://www.polymagnet.com/polymagnets. 2016 Correlated Magnetics.

ELECTRONIC DEVICE HAVING A MAGNETIC ON-OFF SWITCH

BACKGROUND

Field

Description of the Related Art

Audio devices allow users to receive music or other audio content from various media sources, such as laptops, phones, gaming devices, or other types of devices. Typical portable audio devices may include wireless speakers, tethered (wired) headphones or wireless headphones.

Wireless speakers and wireless headphones allow users to be connected to the video, gaming or music playing platform without a physical connection. Wireless headphones are especially popular with video game players, since a player will not become entangled in an interconnecting cord, which connects the headphones to the gaming platform, while the player is playing the video game. Most state-of-the-art wireless speakers and headphones are powered by batteries that have a finite lifetime before they need to be recharged or replaced. Therefore, most consumer electronics manufacturers have been working on ways to improve battery lifetimes and methods to reduce unnecessary power loss in these battery powered devices. However, conventional wireless headphones in the market place today typically remain powered on and continue playing even after they are removed from a user's ear, unless the user powers them off. The action of continually playing audio information after the headphones have been removed from the user's ear(s) wastes the energy stored in the batteries, thus needlessly shortening the useable life of the batteries and use of the wireless headphones. The need to replace or recharge the headphone's batteries is an inconvenience to the user, since it can be costly during periods of high use, it may require the headphones to be unusable for a significant amount of time while they are being recharged and/or lead to a significant amount of environmentally hazardous waste that needs to be recycled.

Also, in the case where the wireless headphones are wireless earbuds, it is common to string the part of the earbuds that is inserted into the user's ears together such that they are tethered to the user so that they will not be easily lost by the user. However, the strung earbuds are typically not anchored to the user for comfort and complexity reasons, so it is not uncommon for these designs to become separated from the user from time to time.

Therefore, there is a need for wireless headphones that are at least able to be easily and securely retained on the user and have a mechanism that can automatically put the wireless headphones into a "sleep" or "off" mode when they are not in use.

SUMMARY

Embodiments of the present disclosure relate to an electronic device, such as a headphone or speaker assembly that contains components that are configured to be magnetically coupled together by use of a complementary magnetic pole configuration in the headphone or speaker assembly. The magnetically coupling of the components can be used to provide information to at least one component so that one or more useful control functions can be performed on at least one of the other components. These useful control functions may include elements that are able to sense that two of the components are in contact with each other, or are at least proximate to each other, so that one of their functions, such as audio playback capability, can be suspended while they are in an unused state.

Embodiments of the present disclosure relate to an electronic device, comprising a first audio component capable of generating an acoustic output from signals received through a communication link, wherein the first audio component comprises a first mating surface and a first primary magnet that has a north pole and a south pole that are oriented in first orientation relative to the first mating surface, and a second audio component capable of generating an acoustic output from signals received through a communication link, wherein the second audio component comprises a second mating surface and a second primary magnet that has a north pole and a south pole that are oriented in a second orientation relative to the second mating surface, and the second orientation is opposite to the first orientation. When the first and the second mating surfaces are positioned proximate to each other, the first and the second mating surfaces are attracted to each other based on the orientation of the first primary magnet and the second primary magnet.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the present disclosure. However, it will be apparent to one of skill in the art that the present disclosure may be practiced without one or more of these specific details. In other instances, well-known features have not been described in order to avoid obscuring the present disclosure.

Embodiments of the present disclosure relate to an electronic device, such as a headphone or speaker assembly that contains two or more audio components, which are configured to be magnetically coupled together by use of a complementary magnetic pole configuration in the headphone or speaker assembly to provide one or more useful functions. These useful functions may include elements that are able to sense that the two or more parts of an electronic device (e.g., audio components) are in contact with each other, or are at least proximate to each other, so that their electronic device function (e.g., audio playback capability) can be suspended when they are in this unused state. In one example, by suspending the audio playback capability of audio components the battery, or power source, lifetime can be prolonged, since the audio components are not delivering audio content while they are not in use. Since the two or more audio components can be brought into contact with each other and be retained in this state by use of a magnetic force created between one or more magnetic components in each of the audio components, this design can also provide a useful mechanism that will allow the headphone assembly to be easily retained on a user.

Moreover, there are often features and/or surfaces on an electronic device that are critical to the functioning of the device or can be easily damaged during normal use. Examples of these features and/or surfaces may include user interface surfaces of an earbud assembly and the output surface of a driver in a speaker, but in general will include any surface or area of an electronic device that would be desirable to protect during periods of non-use. Therefore, there is often a need to protect these features and/or surfaces when the device is not in use by allowing the parts of the electronic device to be positioned and aligned to each other in only one or more desired orientations to hide or protect these critical features or surfaces when the parts of the electronic device are magnetically coupled together.

In one embodiment, the complementary magnetic pole configuration of the one or more magnetic components is disposed within headphone or speaker assemblies to allow one or more useful functions to be performed and/or be automatically or semi-automatically positioned by use of the one or more magnetic components to protect critical features or surfaces of these parts. While the complementary magnetic pole configuration described herein is primarily discussed below in conjunction with one or more audio devices, this configuration is not intended to be limiting as to the scope of the disclosure provided herein since the complementary magnetic pole configuration could also be used in conjunction with other types of electronic devices such as wireless remotes, wireless mice, or any other useful wired or wireless electronic device.

Figure 1A:
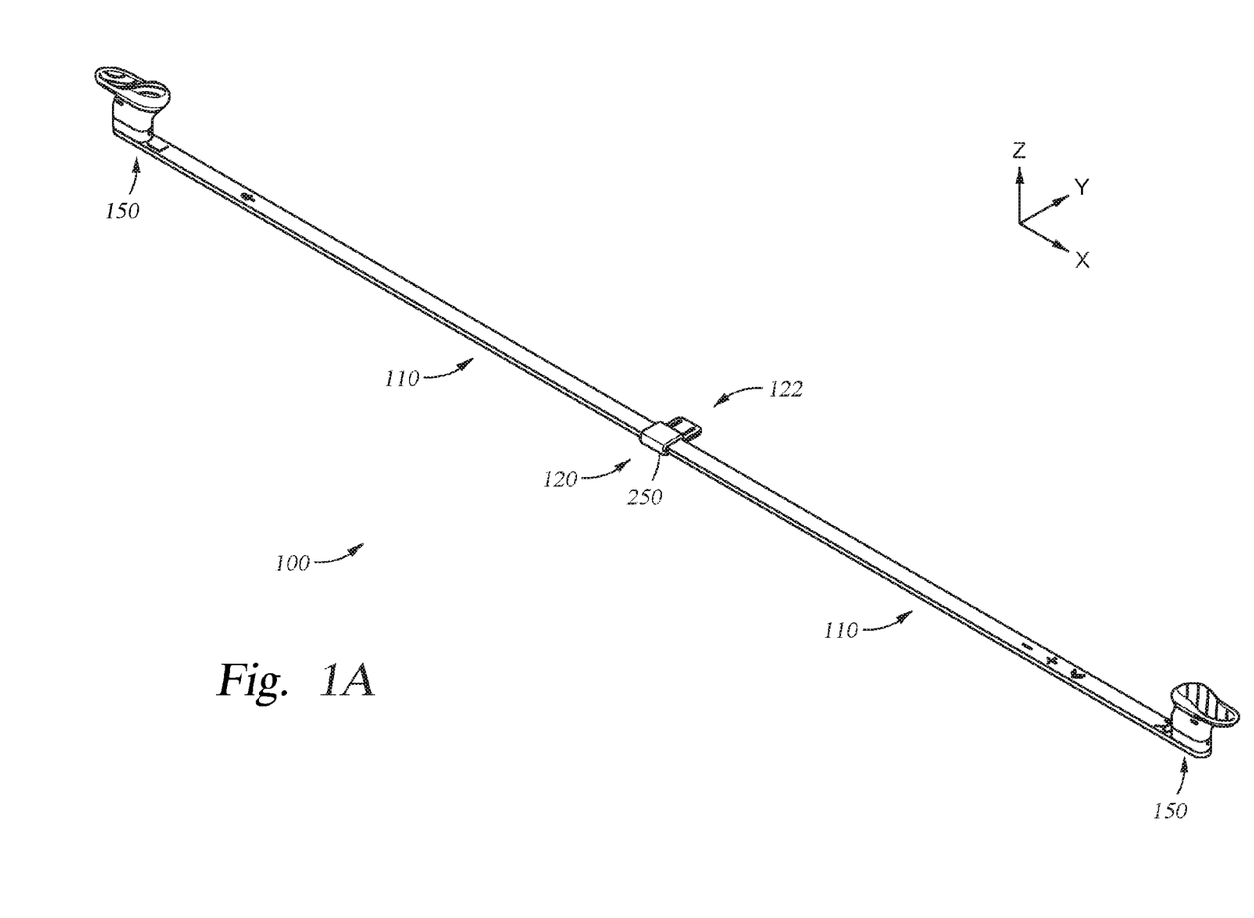
FIG. 1A is an isometric view of an electronic device according to embodiments of the present disclosure.
Figure 1B:
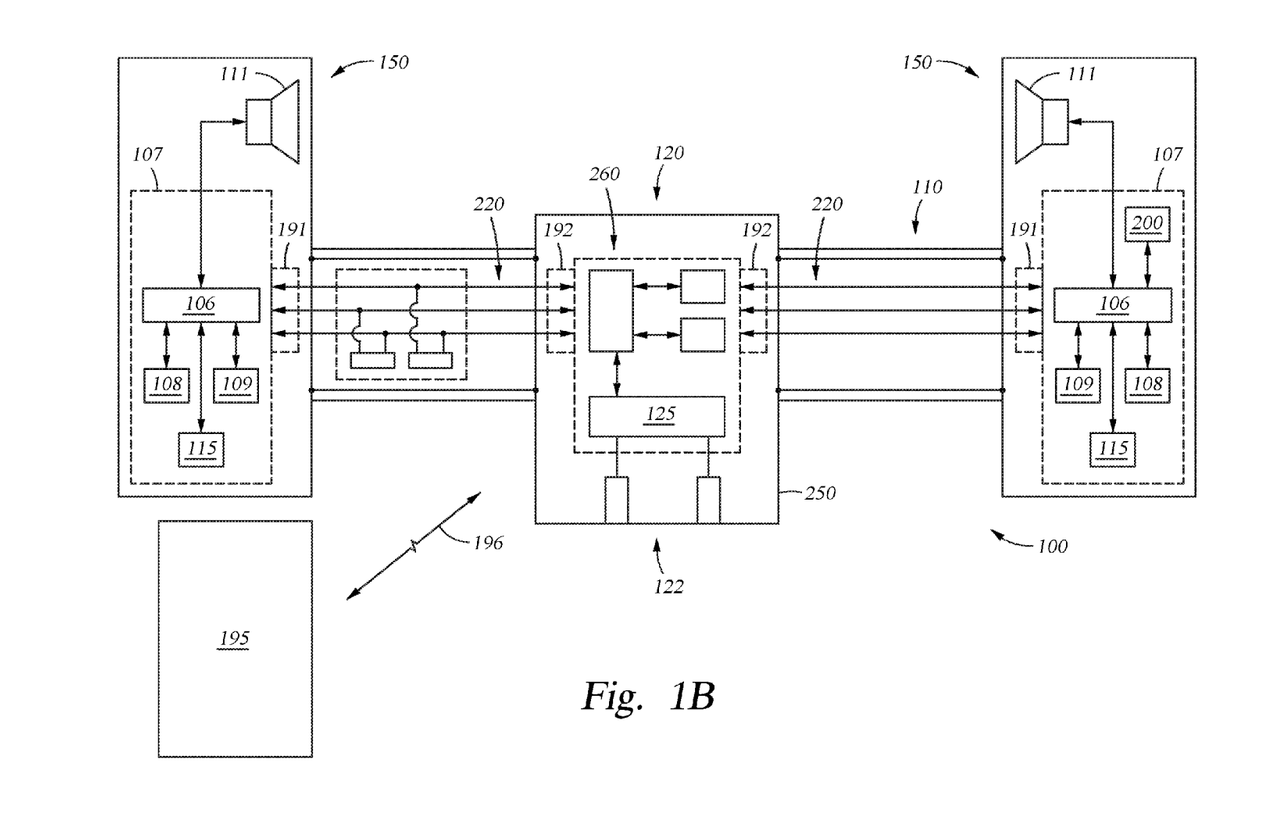
FIG. 1B is an electrical schematic view of the electronic device according to embodiments of the present disclosure.

FIG. 1A is an isometric view of an electronic device 100 according to an embodiment of the present disclosure. FIG. 1B is schematic view of the electronic device 100 that illustrates at least a portion of the electrical and structural interconnections found in the device according to one embodiment of the present disclosure. In some embodiments of the disclosure, the electronic device 100 may be an audio device assembly that includes two components 150A and 150B and a connecting element 110 connecting them. In some configurations, the components 150A-B are adapted to deliver audio content to a user. In some embodiments, connecting element 110 may be configured to be positioned around a user's neck, head, arm or other appendage of a user. When the electronic device 100 is in use, components 150A-B may each be positioned on or inserted within the user's ear to deliver audio content to the user. In one example, the first audio output assembly 150A and second audio output assembly 150B are wireless earbuds, earphones, in-ear monitors, or other similar devices. While the electronic device 100, also referred to herein as an audio device assembly 100, is primarily described herein as being a wireless headphone type system, this configuration is not intended to be limiting as to the scope of the disclosure provided herein since other electronic devices that include an interconnecting cable, such as non-wireless headphone or speaker configurations, may also benefit from the disclosure provided herein.

Connecting element 110 generally includes a plurality of electrical conductors that are adapted to supply power, provide a reference signal (e.g., ground) and/or transfer electrical signals between the various electrical components in the audio device assembly 100. Connecting element 110 is generally used to interconnect the various electrical components in the audio output assemblies 150 and/or electrically connect the audio output assemblies 150 to an interconnection assembly 120. The interconnection assembly 120 may include a device connector 122 that is adapted to electrically connect electrical components within the audio device assembly 100 to an external device, such as a computer, tablet, cell phone, audio delivery device or other useful electronic device. In one example, the device connector 122 is adapted to be coupled to a universal serial bus (USB) port of a computer. When the device connector 122 is connected to a computer it is adapted to deliver power to one or more batteries in the audio device assembly 100 and/or deliver information (e.g., digital audio data, digital media, etc.) to various components found within the audio device assembly 100. Each audio component 150A-B includes various structural and electrical components used to provide the desired information to the user during operation, such as an output electrical assembly 107, a speaker 111, speaker driver assembly 106, a transceiver 115, a memory unit 108 and a battery 490.

In some embodiments, a magnetic circuit 200 may be disposed in one or more audio component 150A-B. In one configuration, the magnetic circuit 200 includes a sensor 425 (FIGS. 2A and 3) that is used to detect when the two or more audio components 150 are positioned so that they are magnetically coupled together by use of two or more magnetic assemblies 411 (FIGS. 2A and 3) that are disposed within their respective audio component 150A-B. Magnetic circuit 200 may further include electronic components that enable it to further process signals produced and output by sensor 425. Each magnetic assembly 411 is typically configured such that it has a complementary magnetic pole configuration with its opposingly mounted magnetic assembly 411 disposed in the opposing audio component, as will be discussed further below.

The transceiver 115 is adapted to receive audio signals from an audio source 195 through a wireless communication link 196, and thus can be used to generate an acoustic output by use of a speaker 111 without being physically connected to the audio source 195. The audio source 195 may be any electronic device capable of transmitting an audio signal by wireless communication. The audio source 195 may be a video game console, a personal computer, a tablet computer, a laptop computer, a digital music player, a cell phone (e.g., a smart phone), an stereo system, a television, a video player (e.g., a DVD player, a Blu-ray player), a radio, or other similar device. The audio source 195 may include one or more transceivers configured to establish one or more different types of wireless communication links with the transceiver 115, such as a Wi-Fi communication link, a Bluetooth® communication link, Avnera Audio Link (AAL) or near field communication (NFC) link. In some configurations, the audio source 195 is only required to communicate with a transceiver 115 in a first audio output assembly 150, which then relays the received information to the electrical components in a second audio output assembly 150 using the one or more of the components in the wiring harness 220.

The speaker driver assembly 106 may include a processing unit (not shown) that is configured to receive signals from the transceiver 115 and transfer the processed audio data (e.g., audio output information) to the speaker 111. The processing unit is also configured to receive signals from a sensor 425 (FIG. 2A) positioned within the magnetic circuit 200. In one embodiment, each audio component 150 is configured to primarily deliver the audio data to a user that is positioned adjacent thereto. The processing unit may be a hardware unit or combination of hardware units capable of executing software instructions and processing data. For example, the processing unit may be a central processing unit (CPU), a digital signal processor (DSP), an application-specific integrated circuit (ASIC), a combination of such units, and so forth. The speaker driver assembly 106 also contains one or more components that are configured to drive the speaker 111 so that the audio signal received from the transceiver 115 can be delivered to the user through the speaker 111. The speaker driver assembly 106 may include a memory unit 108 that is coupled to the processing unit. The memory unit may include any technically feasible type of hardware unit configured to store data, such as a hard disk, a RAM module, a flash memory unit, or a combination of hardware units for storing data. The speaker driver assembly 106 may also further include a software application (not shown) that is stored within the memory unit 108. The software application may include program codes that may be executed by the processing unit to perform various functionalities associated with the audio output assembly 150. In one configuration, the software applications are configured to adjust one or more of the activities performed by the audio components based on information received by one or more sensors (e.g., sensor 425) or the transceiver 115. The activities may include, but are not limited to, turning on or off the audio component, putting the audio component in a "sleep" mode, adjusting the audio output parameters (e.g., volume, EQ settings, etc.) or other useful activities.

The speakers 111 can include any conventional audio generating device, such as a device that includes a primary magnet (not shown) and a voice coil (not shown) that are configured to cooperatively drive a membrane (not shown) to generate an audio signal based on a signal sent from the speaker driver assembly 106. In general, the primary magnet of speaker 111 is a different component from the magnets found in the magnetic assemblies 411, which are described in greater detail below.

Figure 1C:
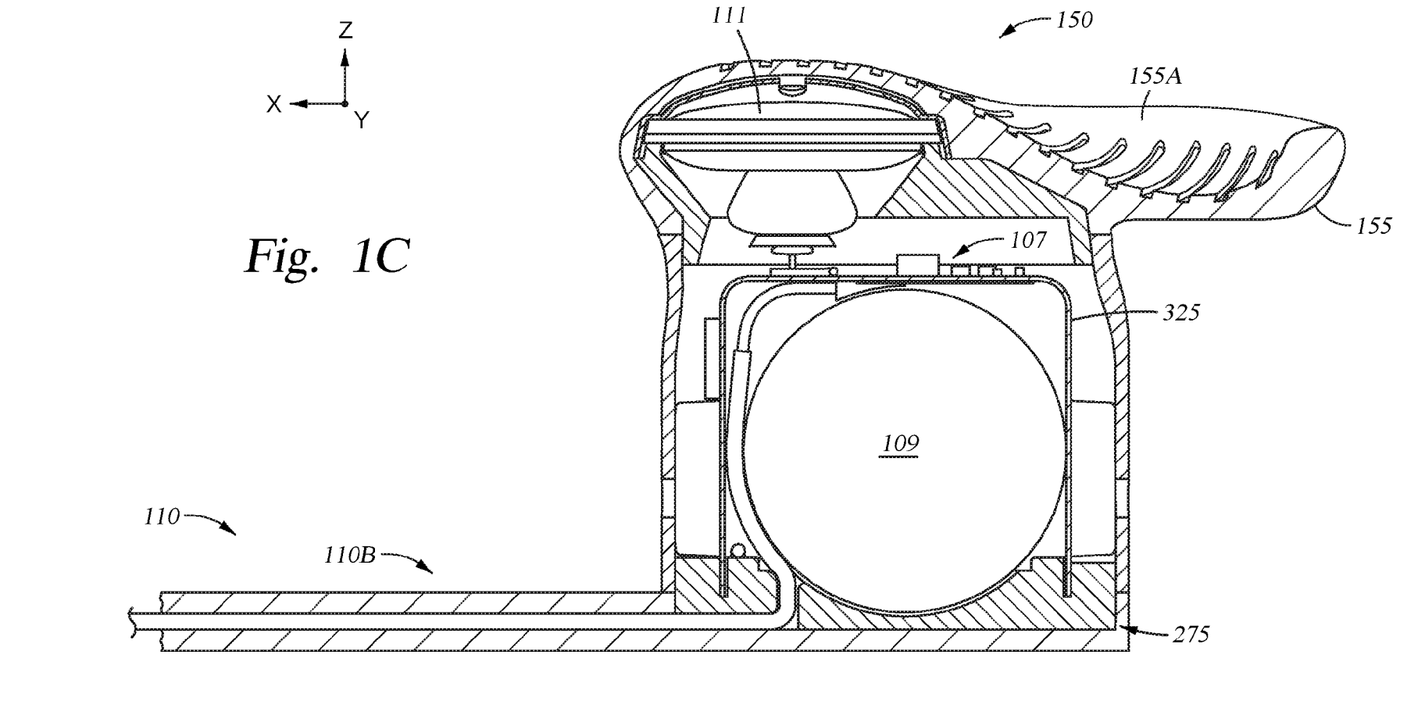
FIG. 1C is a cross section view of the electronic device component according to an embodiment of the present disclosure.

FIG. 1C is a side cross-sectional view of one of the audio components 150 (e.g., audio component 150A) shown in FIGS. 1A-1B. In some embodiments, audio component 150 can be coupled to portions of the cable assembly 110. The audio component 150 generally includes the output assembly structural element 275, the output electrical assembly 107 and the body 315. As discussed above, the output electrical assembly 107 includes various electrical components, such as the speaker 111 that are used to deliver an audio output to a user. Collectively the output electrical assembly 107 includes one or more electrical devices that enable the processing and transmission of an audio signal received from one or more of the components in the output electrical assembly 107, and/or control electronics 260, to a user.

When a user wishes to stop playing audio from components 150, traditionally they had to shut off the device 100 manually. Furthermore, when device 100 was in the "off" state, audio components 150A and 150B were left loose and could get tangled or damaged, or allow the device 100 to mistakenly remain in the "on" state, thereby draining the battery. It will be appreciated by one of skill in the art that the system described below allows the audio components 150A and 150B to be stored in a convenient and safe manner in addition to ensuring that the device 100 remains in the "off" state when the audio components 150A and 150B have been brought together in a clasped position.

Figure 2A:
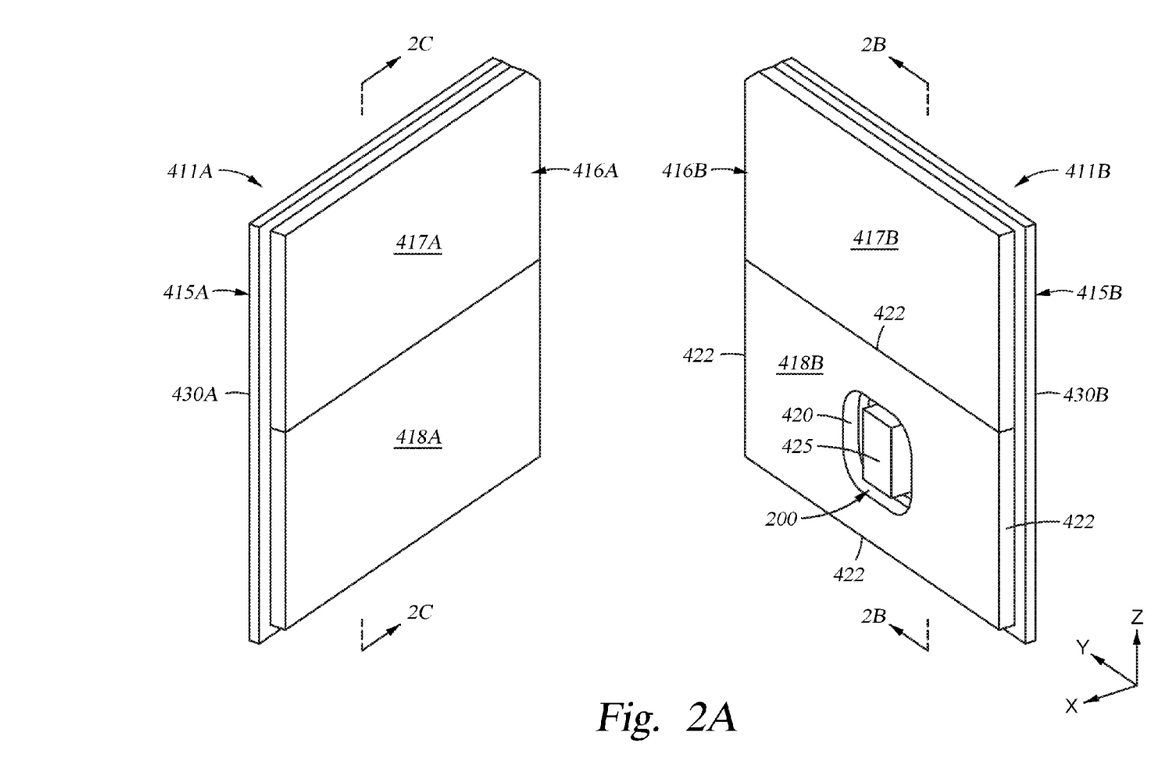
FIG. 2A illustrates an arrangement of magnetic assemblies according to an embodiment of the present disclosure.

FIG. 2A illustrates a mirror isometric view of a simplified magnetic arrangement of magnet assemblies 411 according to an embodiment. As discussed above, the magnetic circuit 200 generally includes a sensor 425 that is able to sense a magnetic field generated by one of the magnets contained within the first magnetic assembly 411A and/or second magnetic assembly 411B. In some configurations, the sensor 425 is oriented within a feature 420 such that components within the sensor 425, which are used to detect the magnetic field direction and/or magnitude, are aligned along an axis A that is substantially parallel to an X-axis. In some embodiments, magnet 417A and 418A are mounted on surface 415A of a backing plate 430, and magnets 417B and 418B are mounted on surface 415B of a backing plate 430. In one embodiment, the magnets 417A and 418A are mounted on surface 415A such that they are substantially coplanar (i.e., Y-Z plane) and oriented such that the north pole of magnet 417A, which is in contact with the surface 415A, is adjacent to the south pole of magnet 418A, which is in contact with the surface 415A, and thus the south pole of magnet 417A is substantially adjacent to the north pole of magnet 418A. Magnets 417B and 418B are mounted on surface 415B of a backing plate 430 such that they are substantially coplanar and oriented such that the north pole of magnet 417B is adjacent to the south pole of magnet 418B, and the south pole of magnet 417B is adjacent to the north pole of magnet 418B. The magnetic orientation in each of the magnetic assemblies 411A-B are complementary, so that the north pole of magnet 417A is facing the south pole of magnet 417B, and the south pole of magnet 417B is facing the north pole of magnet 418B. Therefore, the magnetic assemblies 411A-B will preferentially magnetically align in the orientation shown in FIG. 2A, and would oppose each other if one of the magnetic assemblies 411A-B were rotated 180 degrees about the X-axis and then brought into close proximity. In the configuration shown in FIG. 2A, the exposed surfaces 416A-B, which are opposite to the surfaces 415A-B, can be brought into close physical proximity since the north pole of magnet 417A is substantially aligned with the south pole of magnet 417B, and the south pole of magnet 418A is substantially aligned with the north pole of magnet 418B. The surfaces 415 then experience an attraction to each other due to the force generated by the magnetic fields generated by the respective magnets. Therefore, in this example, the complementary configuration of the magnetic assemblies 411A-B allow a single preferred orientation that will allow the magnetic assemblies to be brought together and retained together by the generated magnetic fields provided by the magnets in the magnetic assemblies 411A-B.

Magnet 418B further includes a feature 420 that is formed therein. In some embodiments, the feature 420 is disposed substantially away from the edges 422 of magnet 418B. In some embodiments, the feature 420 extends through magnet 418B in a direction that is at a desired angle (e.g., parallel) relative to the orientation of the north and south poles of the magnet 418B. Feature 420 may have any desirable shape, such as a circular shape as depicted in FIG. 2A. In other embodiments, feature 420 may have a shape that is circular, semicircular, square, elliptical, slotted, or any other appropriate or desired multifaceted or smooth shape. Although in the current configuration, feature 420 is located on magnet 418B, it may be desirable to locate it on magnet 417B, or on one of the magnets 417A-418A. In some embodiments, feature 420 can alternately or also be located within magnet 417B. In some embodiments, feature 420 is shaped and sized to accommodate the sensor 425 of the magnetic circuit 200.

In the configuration shown in FIG. 2A, the attraction of the complementary oriented magnets 417A and 418A within the magnetic assembly 411A and magnets 417B and 418B within the magnetic assembly 411A creates a holding force between the surfaces 416A-B. In one embodiment, the holding force generated between the surfaces 416A-B is at least 100 grams-force, such as at least 140 grams-force, or at least 150 grams-force. It will be further appreciated that a particular arrangement of magnetic polarities may produce a magnetic force in such a manner as to cause the contact surfaces to align in a particular way when they are positioned proximate to each other.

Figure 5A:
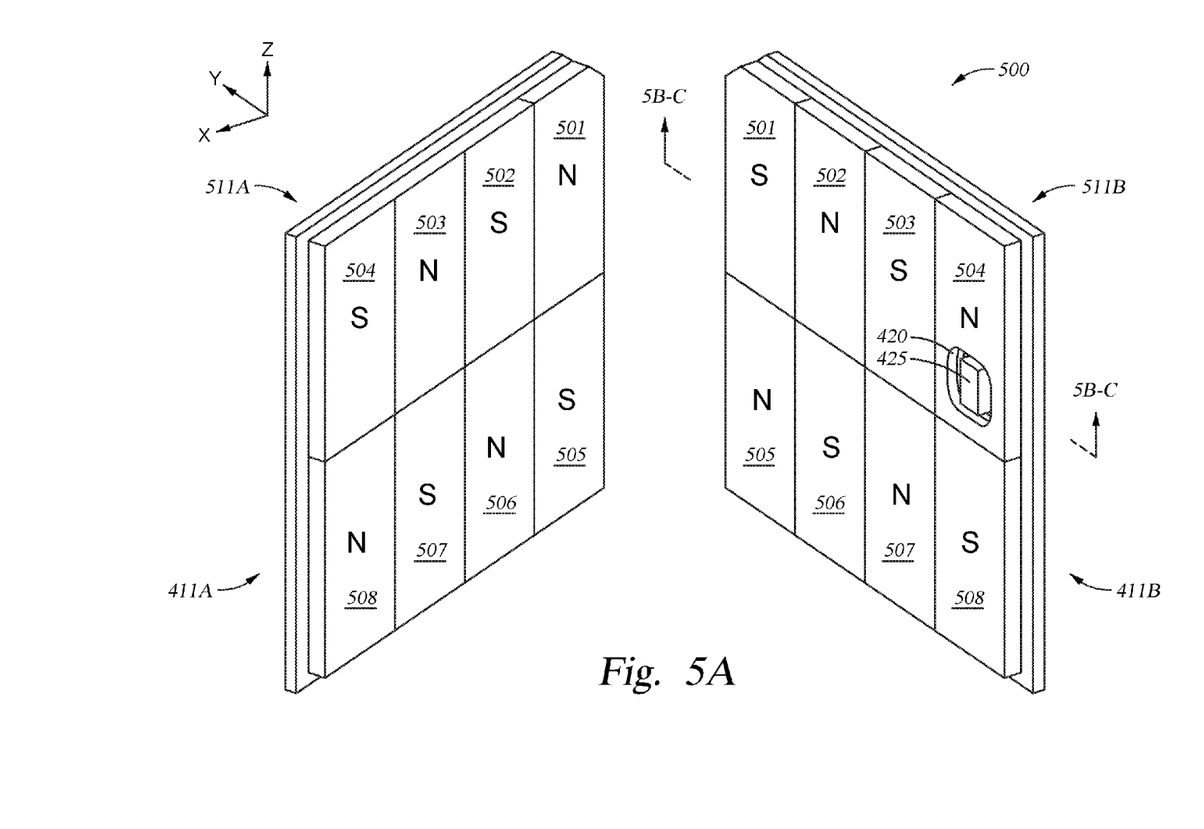
FIG. 5A illustrates a magnet configuration within magnetic assemblies according to an embodiment of the present disclosure.
Figure 5B:
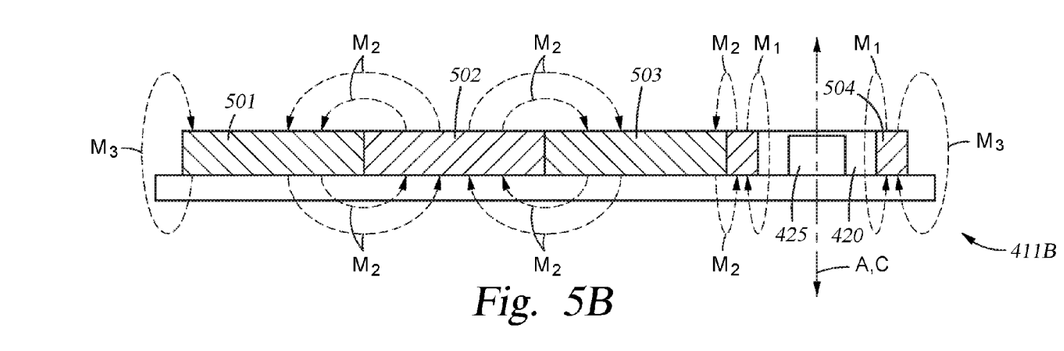
FIG. 5B illustrates the magnetic fields generated by a portion of a magnetic assembly illustrated in FIG. 5A according to an embodiment of the present disclosure.
Figure 5C:
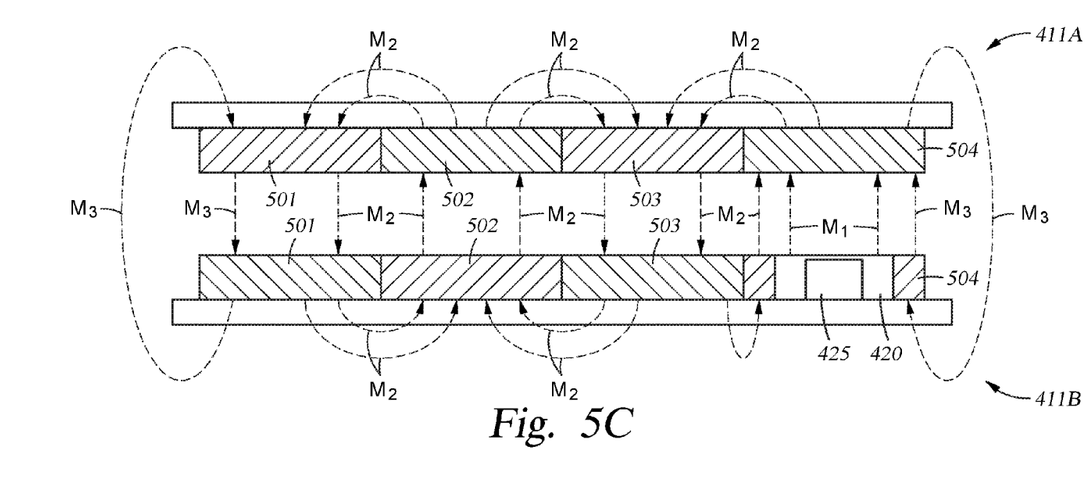
FIG. 5C illustrates the magnetic fields generated by a portion of the magnetic assemblies illustrated in FIG. 5A when they are positioned at least proximate to each other according to an embodiment of the present disclosure.

It will be understood by those skilled in the art that the arrangement of magnetic polarities as described above is merely illustrative, and that many different arrangements are possible as long as the polarities of the magnets on surface 416A are complementary (that is, symmetrically arranged and opposite in polarity) to the magnets on surface 416B. For example, FIGS. 5A-C depict an alternative magnetic arrangement according to an embodiment of the present disclosure. The arrangement of magnetic polarities in FIGS. 2A and 5A is merely illustrative and many other arrangements can be used.

In one embodiment, the magnetic arrays depicted in FIG. 2A-C and FIGS. 5A-C can be realized on a programmable magnet that can act as a device control magnet. In another embodiment, a programmable magnet may be fashioned out of a single piece of material, such as a material that includes a ferromagnetic material that can have different magnet field domains formed therein (e.g., north/south and south/north oriented regions). In one example, the magnetic material includes neodymium and other rare earth magnets, ceramic permanent magnets, Samarium Cobalt, Alnico, and other magnetic materials.

Figure 2B:
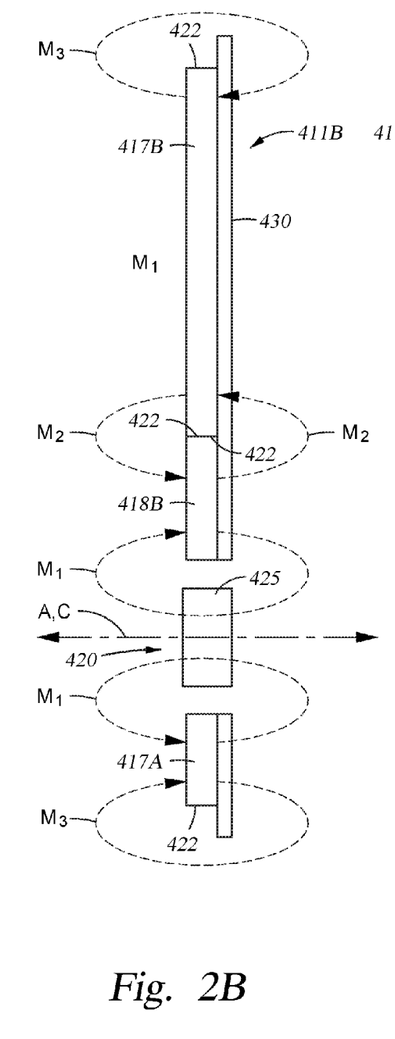
FIG. 2B illustrates the magnetic fields generated by a magnetic assembly illustrated in FIG. 2A according to an embodiment of the present disclosure.
Figure 2C:
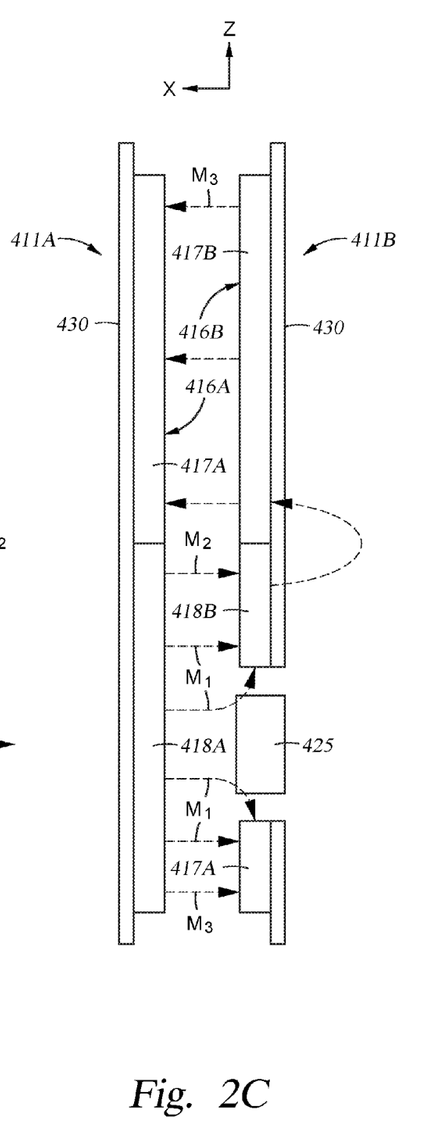
FIG. 2C illustrates the magnetic fields generated by the magnetic assemblies illustrated in FIG. 2A when they are positioned at least proximate to each other according to an embodiment of the present disclosure.

FIGS. 2B and 2C are cross sectional views of the magnetic fields associated with the magnetic arrangement depicted in FIG. 2A. FIG. 2B depicts a cross section view of magnets 417B and 418B formed along the section line 2B-2B in FIG. 2A, and the magnetic field lines M1, M2, M3 that describe the magnetic field emanating therefrom. In one configuration, magnets 417B and 418B are arranged in a substantially coplanar fashion along the Z axis as shown in FIG. 2B, and further arranged such that the north pole of magnet 417B is adjacent to the south pole of magnet 418B. As further depicted in FIG. 2B, the magnetic field lines extend through feature 420 in a direction substantially parallel to the X axis and in a positive X-direction. The magnetic field lines M1 include a closed loop that extends from the north pole of magnet 418B to the south pole of magnet 418B through the feature 420. The magnetic field lines M2 include a closed loop that extends from the north pole of magnet 418B to the south pole of magnet 417B. The magnetic field lines M3 include a closed loop that extends from the north pole of magnet 418B to the south pole of magnet 418B at an edge 422 and a closed loop that extends from the north pole of magnet 417B to the south pole of magnet 417B at an edge 422.

FIG. 2C depicts a cross section view of magnets 417A-B and 418A-B when their respective surfaces 416A-B have been brought close to each other or in physical contact. In one example, the respective surfaces 416A-B are brought close or proximate to each other such that the surfaces 416A-B are at a distance of between about 0.1 millimeters (mm) and about 4 mm apart, such as between about 0.1 millimeters (mm) and about 2 mm apart, or even between about 0.1 millimeters (mm) and about 1 mm apart. Magnets 417A and 418A and 417B and 418B exert a force on one another due to the complementary magnetic pole configuration described above. Because the magnets 417A and 418A in the magnetic assembly 411A and magnets 417B and 418B in the magnetic assembly 411B will interact with each other when they are positioned proximate to each other, the magnetic fields generated by the magnets will interact with each other to form the magnetic fields depicted in FIG. 2C. As illustrated in FIGS. 2A and 2C, magnets 417B and 418B are arranged in a substantially coplanar fashion, such that the north pole of magnet 417B is adjacent to the south pole of magnet 418B. Furthermore, in one arrangement as shown in FIG. 2C, the north pole of magnet 418B can be oriented and positioned directly opposite the south pole of magnet 418A, and the south pole of magnet 417B is oriented and positioned directly opposite the north pole of magnet 417A. As illustrated in FIG. 2C, when magnets 417A-B and 418A-B are positioned proximate to each other, the magnetic field lines extend through feature 420 in a direction substantially parallel to the X axis and in a negative direction. The magnetic field extending through feature 420 is therefore substantially reversed when compared to the magnetic field extending through feature 420 in the arrangement shown in FIG. 2B. Thus, due to the position of the sensor 425 in the feature 420, a change in the magnetic field direction and/or magnetic field strength can be detected by the sensor 425 when the surfaces 416A-B of the magnetic assemblies 411A-B are positioned proximate to each other. In some embodiments, the sensor 425 include a magnetic field detecting device, such as a Hall effect sensor, magnetodiode, magneto-transistor, AMR magnetometer, GMR magnetometer, magnetic tunnel junction magnetometer, Lorentz force detecting sensor, or other similar magnetic field sensing device. In some embodiments, the sensor 425 includes a device that is adapted to detect the direction or change in direction of a magnetic field passing along an axis A (FIG. 2B), or measurement axis, within the sensor 425. In some configurations, the axis A of the sensor is aligned relative to an axis of symmetry of the feature 420 and/or alignment of the magnetic poles of an adjacently positioned magnet (e.g., magnet 418B in FIG. 2B). In some configurations, an axis of symmetry, which coincides with a central axis of a hole that forms the feature 420, is aligned at an angle to, parallel to or collinear with the axis A of the sensor 425 and/or the alignment of the magnetic poles of magnet 418B. In one example, as shown in FIG. 2B, an axis of symmetry C of the feature 420 is collinear with the axis A of the sensor 425 and the alignment of the magnetic poles of magnet 418B. When disposed substantially within feature 420, sensor 425 can be configured to detect the magnetic field formed within feature 420 and generate an output a signal, such as a voltage signal that is sensed by the processor. For example, when component 150B is not in proximity of component 150A, a Hall effect type sensor 425 will detect a magnetic field of a given magnitude and direction within feature 420 and produce a first output voltage. However, when component 150A is brought into physical proximity or contact with component 150B, the resulting change in magnetic field within feature 420 will cause the sensor 425 to produce a second output voltage, which is different from the first output voltage in magnitude and/or sign.

Figure 3:
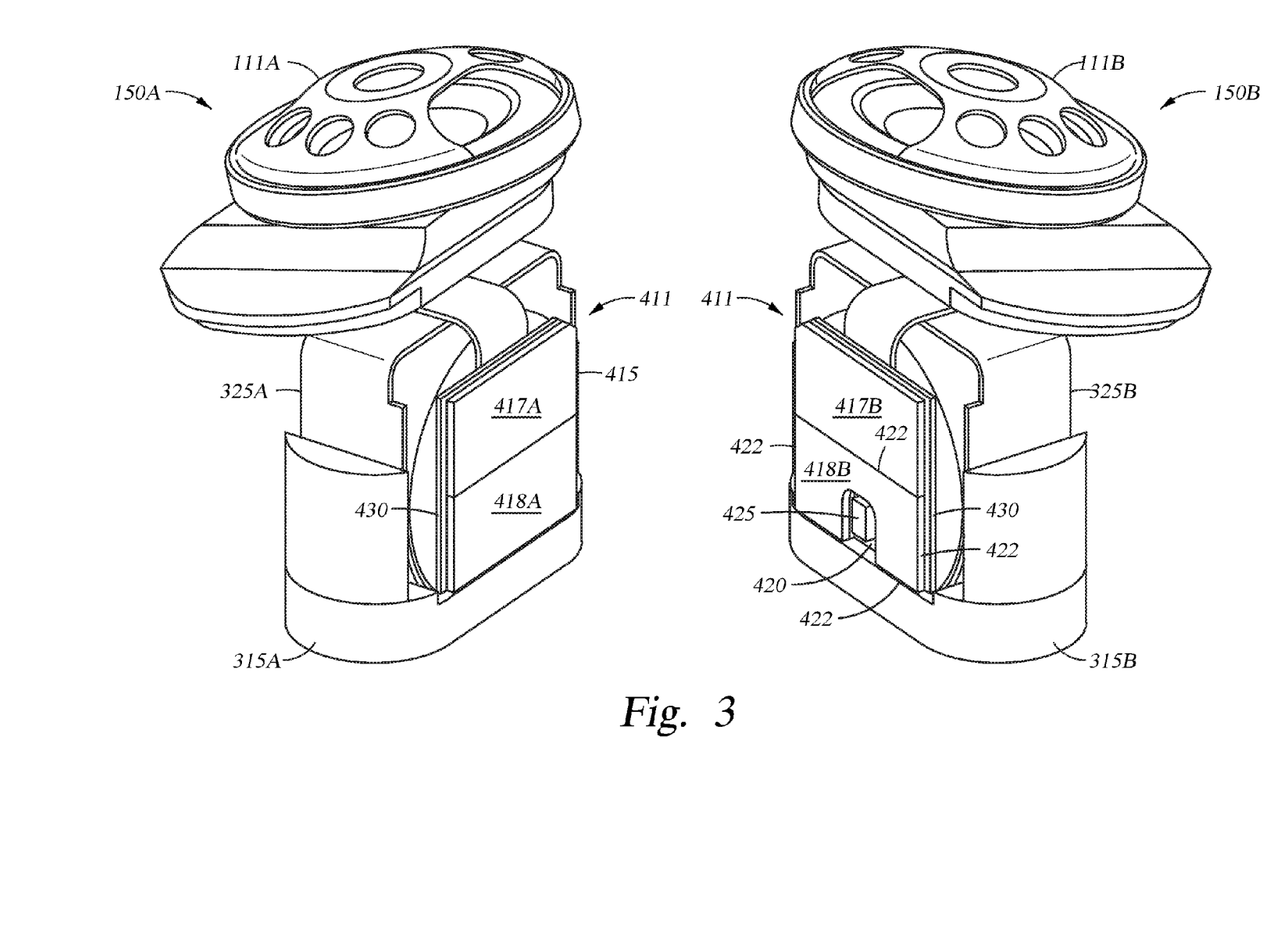
FIG. 3 is an isometric view of portions of the electronic device illustrated in FIGS. 1A-1C according to an embodiment of the present disclosure.

FIG. 3 is an isometric mirror view of the first and second audio components 150A, 150B according to an embodiment. Each of the components 150 includes a speaker 111 and a magnetic assembly 411 mounted on a framework 325. In one embodiment, each magnetic assembly 411 further includes magnets 417 and 418 that are positioned on a backing plate 430. In some embodiments, at least one of the magnets 418 can also have a feature 420 formed therein. In some cases, the feature 420 may be disposed away from the edges 422 of the magnet 418, and may have a sensor 425 disposed therein. In some embodiments, magnets in the magnetic assemblies 411, such as magnetic assemblies 411A-B, are oriented such that the magnetic poles of magnets within the magnetic assemblies 411 are oriented in a complementary fashion, thus, as discussed above, allowing a magnetic force to bring audio components 150A and 150B together. In other word, the north pole and south pole of adjacently position magnets (e.g., magnets 417A and 417B, and magnets 418A and 418B) will tend to align. As explained further with respect to FIGS. 2A-C above, bringing the components 150A and 150B into physical proximity or contact will produce a change in the magnetic field lines passing through the feature 420. In particular, the detected magnetic field passing through feature will be reversed or significantly reduced depending on the position of the sensor 425 within the feature 420, thus allowing sensor 425 within feature 420 to detect a significant change and produce an electric signal indicating that components 150A and 150B have been brought together in a "proximate" or "clasped" configuration. Similarly, when the components 150A, 150B are moved apart from the clasped condition, the detected magnetic field passing through feature 420 will revert to the original magnetic field direction and magnitude, which is the same magnitude and direction of magnetic field that exists in feature 420 when components 150A and 150B are not in physical proximity or contact with one another. In some embodiments, the act of bring the audio components together can also be used to cause each audio component to go into an "off" or "sleep" state due to the actions of the processor found within the speaker driver assembly 106, as will be discussed further below.

Figure 4:
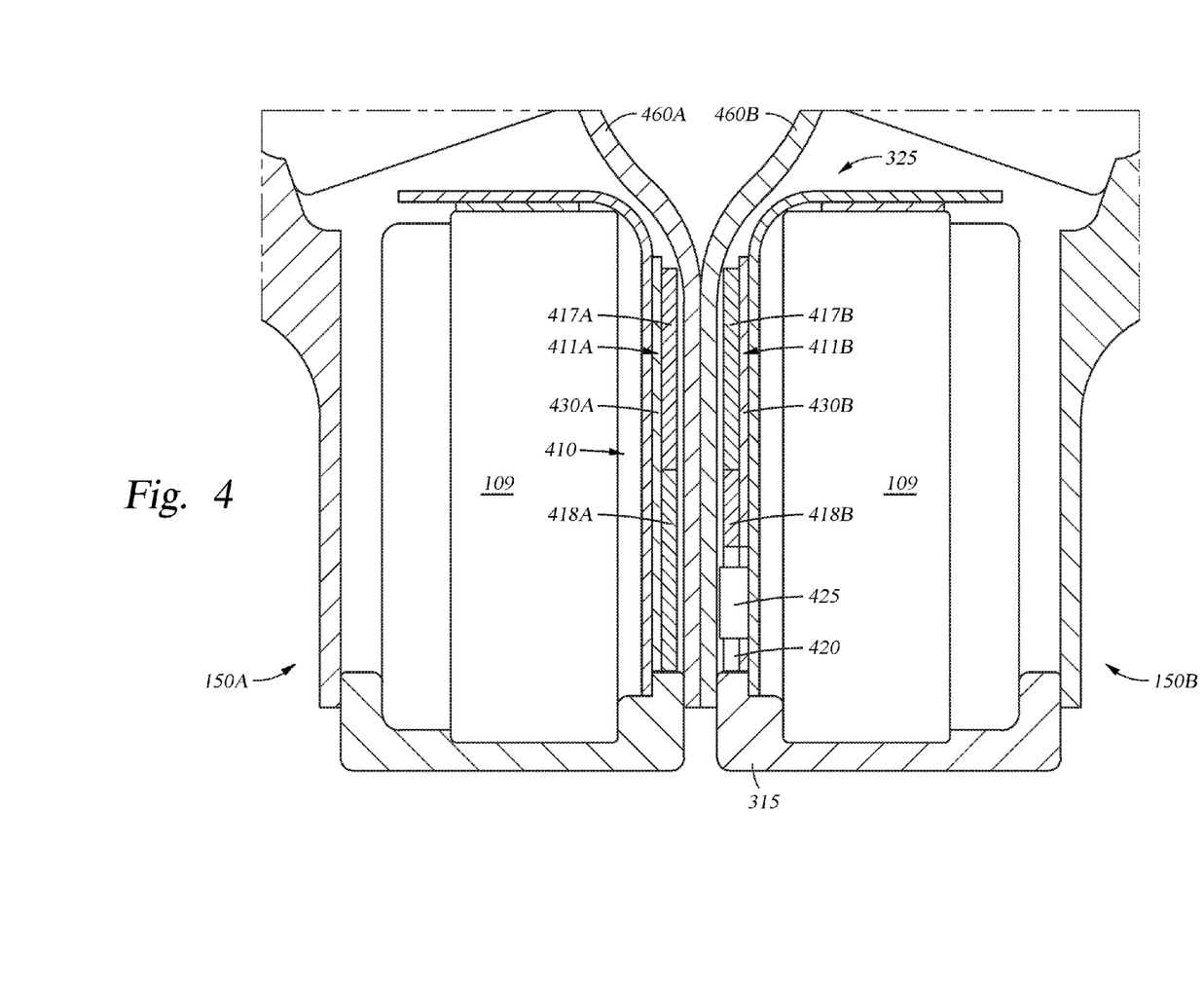
FIG. 4 is a side cross sectional view of portions of the electronic device illustrated in FIGS. 1A-1C according to an embodiment of the present disclosure.

FIG. 4 is a schematic side cross-sectional view of the first and second audio components 150A, 150B that have outer surfaces 460A, 460B that have been brought into physical contact with each other due to the complementary magnetic pole configuration of the magnetic assemblies 411A-B illustrated in FIG. 3. Each of the components 150A, 150B include a body 315 and a framework 325 on which components including a battery 490 and a magnetic assembly 411 may be mounted. In one configuration, the body 315 may include a conductive material, such as a steel, aluminum, other type of metal or conductive plastic. In another configuration, body 315 may include a plastic material. The materials used to form the outer surfaces 460A-B are configured to allow the component 150A to be brought into contact with component 150B by the attractive force generated due to the orientation and position of the magnetic assemblies 411A-B. In some embodiments, the shape of components 150A and 150B are tailored to allow the mating surfaces 460A and 460B to be brought together and held by the complementary magnetic pole orientation configuration when the magnetic assemblies 411A-B are positioned proximate to each other. In some cases, each of the audio components 150A, 150B may contain a notch, surface or other feature that allows them to be aligned and/or brought together in a desired configuration due to the complementary magnetic fields generated by the magnetic assemblies 411A-B. In some configurations, it is desirable to configure the mating surfaces 460A, 460B so that they cover and/or protect the audio generating regions of the audio components 150A, 150B. In some configurations, it is desirable to configure the mating surfaces 460A, 460B so that they allow the audio components 150A, 150B to be easily stored and protected by an alignment of the audio components 150A, 150B that is induced by the complementary magnetic fields generated by the magnetic assemblies 411A-B.

The material used to form the mating surfaces 460 can be formed from a dielectric material that electrically isolates the various electrically conductive components disposed within the audio component 150, as well as electrically isolating audio component 150A from component 150B. In one example, the material used to form the mating surface 460 is formed from a plastic or polymeric material, such as ABS, polycarbonate, acrylic, polyethylene, silicone or other similar polymer containing material.

The mating surfaces 460 can also be formed from a material having a low friction coefficient. In one embodiment, the friction coefficient of each of the mating surfaces 460 is selected so as to minimize the frictional force produced between audio components 150A and 150B when they are in the "clasped" position. In one example, it is desirable to reduce the frictional force (e.g., shear force) to a magnitude of less than 100 grams-force, such as less than 70 grams-force, or even less than 50 grams-force. Minimizing the frictional force between audio components 150 can be used to ensure that the audio components 150 become more easily aligned in a desired orientation by the force induced by the magnetic fields generated by the magnets disposed within the magnetic assemblies 411A-B. In some embodiments, the frictional force can be adjusted and/or controlled between the surfaces 460A-B by selecting a desired surface roughness, surface hardness, surface material, surface material property (e.g., hydrophobic, hydrophilic) and other static or dynamic friction creating properties of a surface.

In one configuration, magnets 417A-B and 418A-B are portions of a programmable magnet that can incorporate various patterns of magnetic polarity by having such patterns programmatically defined and implemented in a single piece of material. For example, magnets 417A-B and 418A-B can be programmed to substantially replicate the configuration depicted in FIGS. 2A-C. Magnet 417A can be programmed such that the north pole of magnet 417A is oriented facing towards the surface 416A that is aligned to the mating surface 460A and a south pole of magnet 417A is oriented facing towards the backing element 430A. Magnet 418A can be programmed such that the south pole of magnet 418A is oriented facing towards surface 416A that is aligned to the mating surface 460A and a north pole of magnet 418A is oriented facing towards the backing element 430A. Magnets 417B and 418 can be oriented in a complementary fashion relative to the surface 416B that is aligned to the mating surface 460B. A programmable magnet can reduce the space requirements and allow for a smaller size of audio component 150A-B. However, it will be apparent to one of skill in the art that magnets 417A-B and 418A-B can be formed as necessary to achieve the desired effect, as discussed in further detail below. In one embodiment, all of the magnets 417A-B and 418A-B may have substantially similar magnetic field strength or similar magnetic flux. In other embodiments, magnets 417A and 417B may have a different magnetic field strength or magnetic flux from magnets 418A and 418B. In other embodiments, one or more of the magnets 417A-B and 418A-B may have a different magnetic field strength or magnetic flux from each of the other magnets 417A-B and 418A-B.

In some embodiments, the backing element 430 is disposed between magnets 417, 418 and the framework 325. Backing elements 430 may include a ferrous material (e.g., ferromagnetic material) that can be used to concentrate the magnetic fields generated by the magnets 417, 418 to improve the operation of sensor 420 as well as increase the magnetic force between audio components 150A and 150B.

In some embodiments, during operation, the sensor 425 is able to generate a signal that is indicative of a change in the magnetic field created when the components 150A-B are physically positioned proximate to or in contact with each other. The generated signal is then detected and processed by the processor within the speaker driver assembly 106. During the processing step the processor may compare the signal received from the sensor 425 with information stored in the memory of the electronic device 100 to determine if the components 150A-B have been physically positioned proximate to or in contact with each other. Upon determining that the components 150A-B are physically positioned proximate to or in contact with each other, the processor can then cause one or more activities to be performed, such as halt tasks that are being performed by components within the electronic device 100. In one example, the processor may cause the audio playback delivered from the electronic device to be suspended (e.g., halted, stopped or paused for a period of time) and/or the power to the audio components 150A and 150B can be shut off. In another example, the processor may cause a separate audio source, such as a phone or portable music player, to halt the delivery of audio information to the electronic device 100 by sending a "stop" signal to the separate audio source based on the received signal from the sensor 425.

FIG. 5A depicts an embodiment of the present disclosure showing an alternative complementary configuration of magnets. A magnetic array 500 includes a plurality of magnets that are positioned within each of the two or more magnetic assemblies 411A-B. In general, each magnetic assembly 411 with the magnetic array 500 can include 2, 3, 4, 5, or more magnets, such as 8 magnets shown in FIG. 5A. It will be appreciated by one of skill in the art that the depicted arrangement of magnetic polarities can be used in the audio device 100 detailed above in order to orient audio components 150A,B in a particular orientation with respect to each other, based on the magnetic fields generated by magnets 501-508 in each of the two or more magnetic assemblies 411A-B. Magnetic array 500 is arranged such that the front side 512 includes a set of magnetic poles arranged in the pattern shown, wherein the top row of the magnetic assembly 411A has magnetic poles arranged from left to right as south (S), north (N), south (S), and north (N), and the bottom row has magnetic poles arranged, from left to right as north (N), south (S), north (N), and south (S), whereas the magnets in the top row and bottom row of the magnetic assembly 411B have the magnetic poles arranged in an opposing relationship to the magnetic assembly 411A, as shown. One will note that the magnetic poles need not be arranged in a symmetric or alternating north-south orientation as shown in FIG. 5A and can thus be arranged in any desirable array or pattern. In one example, the top row is arranged in a NSSN pattern from left to right and in a SNNS on the bottom row from left to right, and the magnetic poles in the opposing the magnetic assembly are configured in an opposing relationship. In another example, the top row is arranged in a NSNN pattern from left to right and in a SNSS on the bottom row from left to right, and the magnetic poles in the opposing the magnetic assembly are configured in an opposing relationship. In yet another example, the top row is arranged in a SSNN pattern from left to right and in a NSNS on the bottom row from left to right, and the magnetic poles in the opposing the magnetic assembly are configured in an opposing relationship.

FIGS. 5B and 5C are cross sectional views of the magnetic fields associated with the magnetic arrangement 500 depicted in FIG. 5A. FIG. 5B depicts a cross section view of magnets 501-504 and the magnetic field lines M1, M2, M3 that describe the magnetic field emanating therefrom. In one configuration, magnets 501-504 are arranged in a substantially coplanar fashion along the Z axis as shown in FIG. 5B, and further arranged such that the north pole of magnet 501 is adjacent to the south pole of magnet 502. Magnet 504 further has a feature 420 disposed therein, the feature 420 containing a sensor 425. As further depicted in FIG. 5B, magnetic field lines extend through feature 420 in a direction substantially parallel to the X axis and in a positive X-direction. The magnetic field lines M1 include a closed loop that extends from the north pole of magnet 504 to the south pole of magnet 503 through the feature 420. The magnetic field lines M2 include a closed loop that extends from the north pole of magnet 502 to the south pole of magnet 503, and from the north pole of magnet 503 to the south pole of magnet 502. The magnetic field lines M3 include a closed loop that extends from the north pole of magnet 501 to the south pole of magnet 501, and from the north pole of magnet 504 to the south pole of magnet 504.

FIG. 5C depicts a cross section view of magnets 501-504 when they have been brought close to each other or into physical contact with a set of magnets having an opposing magnetic pole orientation. Magnets 501-504A and 501-504B exert a force on one another due to the complementary magnetic pole configuration. Due to the arrangement of magnets 501-504, the magnetic field lines M1 extend through feature 420 in a direction substantially parallel to the positive X axis and in a negative X-direction. The magnetic field lines M1 extending through feature 420 is therefore substantially reversed when compared to the magnetic field lines M1 extending through feature 420 in FIG. 5B. Because the magnets 501-508A in the magnetic assembly 411A and magnets 501-508B in the magnetic assembly 411B will interact with each other when they are positioned proximate to each other, the magnetic fields generated by the magnets will interact with each other to form the magnetic fields depicted in FIG. 5C. As illustrated in FIGS. 5A and 5C, magnets 501-508 are arranged in a substantially coplanar fashion, such that the north pole of magnet 501A is adjacent to the south pole of magnet 501B, the south pole of magnet 502A is adjacent to the north pole of magnet 502B, the north pole of magnet 503A is adjacent to the south pole of magnet 503B, and the south pole of magnet 504A is adjacent to the north pole of magnet 504B. As illustrated in FIG. 5C, when magnets 501-4A and 501-4B are positioned proximate to each other, the magnetic field lines extend through feature 420 in a direction substantially parallel to the X axis and in a negative direction. The magnetic field extending through feature 420 is therefore substantially reversed when compared to the magnetic field extending through feature 420 in the arrangement shown in FIG. 5B.

In some embodiments, the arrangements of magnetic polarities shown above in FIGS. 2A and 5A can create a magnetic field pattern such that audio components 150A and 150B can only be brought together into the clasped condition when oriented in a particular or desired way. In one embodiment, the magnetic polarity orientation can ensure that audio components 150A and 150B are brought together so as to minimize the possibility of damage or excessive stress.

While the discussion provided above primarily discusses a complementary magnetic pole configuration that is used in conjunction with a wireless headphone system, this configuration is not intended to be limiting as to the scope of the disclosure provided herein, since the hardware configurations and methods described herein could also be used to solve similar problems found in a wireless speaker system. The disclosure has been described above with reference to specific embodiments. Various embodiments may be used in alone or in combination. Persons skilled in the art, however, will understand that various modifications and changes may be made thereto without departing from the broader spirit and scope of the disclosure as set forth in the appended claims. The foregoing description and drawings are, accordingly, to be regarded in an illustrative rather than a restrictive sense.

The invention claimed is:

1. An electronic device, comprising:
   a first electronic component, comprising:
     a first device control magnet that has a north pole and a south pole that are aligned along a first direction, wherein the first direction is oriented in a first orientation relative to a first mating surface; and
     a first feature formed through a portion of the first device control magnet, wherein the first feature is aligned along a first axis that is oriented relative to the first direction;
   a second electronic component, comprising:
     a second device control magnet that has a north pole and a south pole that are aligned in a second direction, wherein the north pole and the south pole of the second device control magnet are oriented in a second orientation relative to a second mating surface, and the first and the second device control magnets are attracted to each other when the first and the second mating surfaces are disposed proximate to each other; and
   a sensor disposed within the first feature, wherein the sensor is configured to detect a change in a magnetic field passing through the first feature.

2. The electronic device of claim 1, wherein the first axis is substantially parallel to the first direction.

3. The electronic device of claim 1, further comprising:
   a processor that is configured to halt the delivery of audio information provided from a speaker within the first electronic component or the second electronic component in response to detecting the change in magnetic field.

4. The electronic device of claim 1, wherein the first device control magnet is a programmable magnet.

5. The electronic device of claim 1, wherein the sensor is configured to detect changes in a magnitude or a direction of a portion of a magnetic field that passes parallel to a measurement axis of the sensor, wherein the measurement axis is parallel to the first axis.

6. The electronic device of claim 1, wherein
   the first electronic component further comprises a first backing element that is disposed between the first device control magnet and a first body of the first electronic component, and
   the second electronic component further comprises a second backing element that is disposed between the second device control magnet and a first body of the second electronic component.

7. The electronic device of claim 6, wherein the first backing element and the second backing element are formed from a ferrous metal.

8. The electronic device of claim 1, wherein the first feature is not coincident with an edge of the first device control magnet.

9. The electronic device of claim 1, wherein the first feature is a substantially semicircular notch disposed within the first device control magnet.

10. The electronic device of claim 1, wherein when the first and the second mating surfaces are disposed proximate to each other the first and the second mating surfaces are placed in physical contact with each other, and the distance between the first device control magnet and the second device control magnet when the first and the second mating surfaces are positioned to contact each other is less than 1 mm.

11. The electronic device of claim 1, wherein the first device control magnet and the second device control magnet exert a magnetic force of at least 100 grams-force when the first and the second mating surfaces are disposed proximate to each other.

12. An electronic device, comprising:
    a first audio component capable of generating a first acoustic output, comprising:
      a first device control magnet that has a north pole and a south pole that are aligned in a first direction, wherein the first direction is oriented in a first orientation relative to a first mating surface;
      a first backing element, disposed substantially along a back surface of the first device control magnet; and
      a first feature formed through a portion of the first device control magnet, wherein the first feature is aligned along a first axis that is oriented relative to the first direction;
    a second audio component capable of generating a second acoustic output, comprising:

a second device control magnet that has a north pole and a south pole that are aligned in a second direction, wherein the north pole and the south pole of the second device control magnet are oriented in a second orientation relative to a second mating surface, and the first and the second device control magnets are attracted to each other when the first and the second mating surfaces are disposed proximate to each other;

a second backing element, disposed substantially along a back surface of the second device control magnet; and a sensor disposed within the first feature, wherein the sensor is configured to detect a change in a magnetic field passing through the first feature.

13. The electronic device of claim 12, wherein the first axis is substantially parallel to the first direction.

14. The electronic device of claim 12, further comprising:
a processor that is configured to halt the delivery of audio information provided from a speaker within the first audio component or the second audio component in response to detecting the change in magnetic field.

15. The electronic device of claim 12, wherein the first device control magnet is a programmable magnet.

16. The electronic device of claim 12, wherein the sensor is configured to detect changes in a magnitude or a direction of a portion of a magnetic field that passes parallel to a measurement axis of the sensor, wherein the measurement axis is parallel to the first axis.

17. The electronic device of claim 12, wherein the first backing element and the second backing element are formed from a ferrous metal.

18. The electronic device of claim 12, wherein the first feature is located substantially away from the edges of the first device control magnet.

19. The electronic device of claim 12, wherein the first feature is a substantially semicircular notch disposed within the first device control magnet.

* * * * *